Sept. 8, 1970 — D. H. BAILEY — 3,527,473
SIDE EXHAUST COVER ASSEMBLY
Filed June 5, 1968
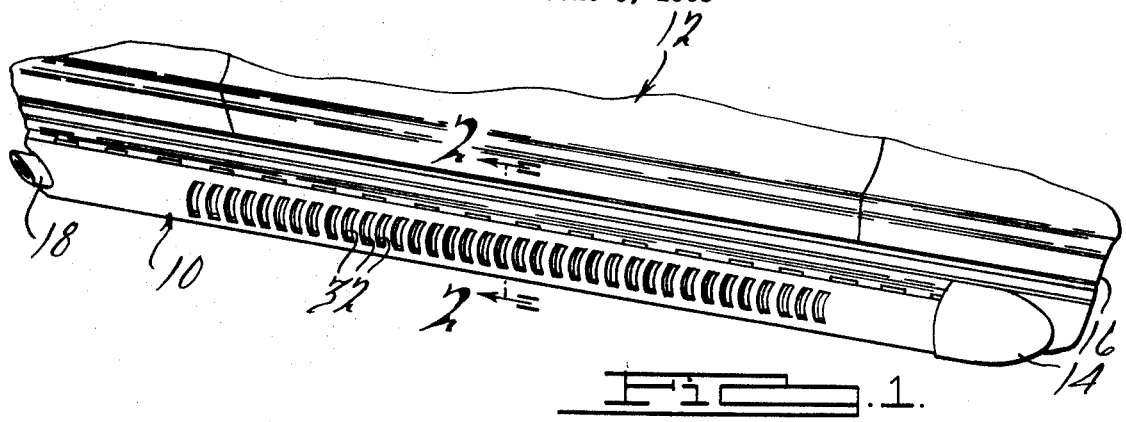
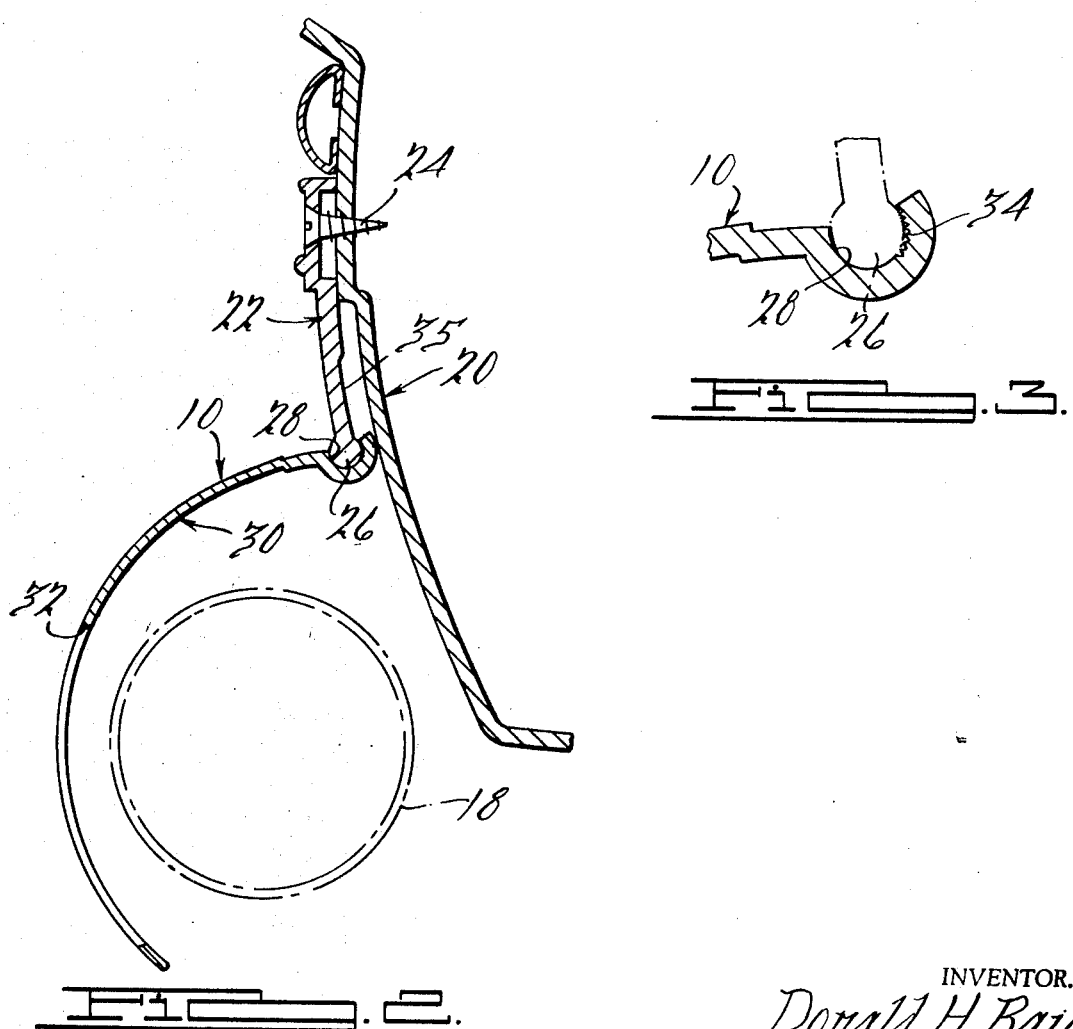
INVENTOR.
Donald H. Bailey.
BY Harness, Dickey & Pierce
ATTORNEYS United States Patent Office 3,527,473
Patented Sept. 8, 1970

3,527,473
SIDE EXHAUST COVER ASSEMBLY
Donald H. Bailey, Livonia, Mich., assignor to U.S. Automotive Products, Inc., Detroit, Mich., a corporation of Michigan
Filed June 5, 1968, Ser. No. 734,594
Int. Cl. B60r 27/00
U.S. Cl. 280—150                             4 Claims

ABSTRACT OF THE DISCLOSURE

A cover assembly for the exhaust pipe of vehicles having side exhaust systems which cover assembly includes a pivot hinge construction whereby a portion of the cover assembly can be pivoted to accommodate dimensional variations between different vehicle bodies.

SUMMARY BACKGROUND OF INVENTION

The present invention relates to covers for side exhaust systems.

In vehicles having a side exhaust system in which the exhaust pipe extends rearwardly generally along the sills or lower body portion, it is desirable to have a decorative cover which will conceal the exhaust pipe while enhancing the appearance of the vehicle. One problem is that each vehicle, because of differences in construction, would require a separate cover. With the present invention this problem has been eliminated by the provision of a pivot construction whereby a portion of the cover assembly can be pivoted and different vehicle constructions can be accommodated. Therefore, it is an object of the present invention to provide a novel exhaust cover assembly for side exhaust systems.

It is still another object of the present invention to provide an exhaust cover assembly which is capable of accommodating a number of different vehicles. It is still another object of the present invention to provide an exhaust cover assembly in which at least a portion of the cover assembly is pivotally secured to accommodate different vehicle constructions.

Other objects, features, and advantages of the present invention will become apparent from the subsequent description and the appended claims, taken in conjunction with the accompanying drawings, in which:

FIG. 1 is a fragmentary pictorial view depicting the exhaust cover assembly of the present invention shown in assembly relationship with a vehicle;

FIG. 2 is a sectional view to enlarged scale taken generally along the line 2—2 in FIG. 1; and FIG. 3 is a fragmentary, enlarged sectional view of the hinge construction of FIG. 2.

Looking now to the drawings, an exhaust cover assembly is generally indicated by the numeral 10 and is shown assembled to an automotive vehicle body 12 (only partially shown). An adapter 14 is located towards the forward end of the body near the forward wheel well 16 and is constructed to receive an exhaust pipe portion (not shown). Since the details of the adapter 14 do not constitute a part of the present invention, they have been omitted for purposes of simplification.

An exhaust pipe 18 extends longitudinally of the body 12 (FIG. 2) and is located proximate to the lower portion of a side sill or rocker panel 20. The cover assembly 10 is to connected to the side sill 20 and has a generally flat longitudinally extending mounting plate 22 which is secured to an upper portion of the sill 20 by a plurality of threaded fasteners 24 which are located at spaced positions along the upper edge of the mounting plate 22. The lower end of the mounting plate 22 terminates in a circularly shaped end portion 26 which is pivotably received within a generally semicircular socket portion 28 of a cover part 30. The cover part 30 is generally of an arcuate section which extends downwardly such that it will overlie the exhaust pipe 18.

Note that the mounting plate 22 follows the general curved, contour of the sill 20 and extends downwardly and inwardly. Also note that the lower end of the mounting plate 22 is provided with a relief 35 to further facilitate pivoting movement of the socket portion 28 relative to the end portion 26.

The arcuate portion of cover part 30 can be provided with a plurality of longitudinally space slots 32 for cooling. In applications where cooling is not required, the slots 32 can be replaced with decorative stripes, etc. Note that while the circular end portion 26 is generally of a smooth construction, the mating portion of the slot 28 is partially roughened by a plurality of longitudinally extending teeth 34. In assembly, the mounting plate 22 and cover part 30 are mounted together by longitudinally slipping the circular end portion 26 into the socket portion 28. Depending upon the particular vehicle body construction, i.e. particularly the shape of the sill or rocker panel, the cover part 30 can be pivoted further toward or away from the sill (such as sill 20) to accommodate the different locations of the exhaust pipe 18. The end portion 26 fits into socket portion 28 with a snug fit such that the teeth 34 will bite into the material of the circular end portion 26 to positively retain the positional relationship between the mounting plate 22 and the cover part 30.

As can be seen with the above noted construction, and attractive cover is provided for the exhaust pipe 18 while the pivot construction permits the assembly 10 to accommodate a variety of automobile body constructions.

While it will be apparent that the preferred embodiment of the invention disclosed is well calculated to fulfill the objects above stated, it will be appreciated that invention is susceptible to modification, variation and change without departing from the proper scope or fair meaning of the invention.

What is claimed is:

1. In an automotive vehicle having a side exhaust system including an exhaust member extending longitudinally proximate the lower portion of the vehicle body the improvement comprising: cover assembly means for substantially covering the exhaust member, said cover assembly means comprising a support member fixed to the lower portion of the vehicle body, a cover member extending generally co-extensively for generally covering the exhaust member, and connection means connecting said support member and said cover member for selective movement of said cover member towards and away from the exahust member whereby different vehicle bodies can be accommodated by one cover assembly means, said connection means including holding means for holding said cover member in selected positions relative to said support member, said connection means comprising a generally circular socket on one of said support and cover members and a similarly shaped end portion on the other of said support and cover members to thereby define a two-piece hinge structure with said end portion adapted to be pivotally supported in said socket.

2. The apparatus of claim 1 with said holding means comprising a roughened surface on one of said socket and said end portion.

3. The apparatus of claim 2 with said socket being on said cover member and said end portion being on said support member, said support member extending inwardly toward the vehicle body in a downward direction, said cover member having a generally arcuate contour.

4. The apparatus of claim 1 with said holding means comprising a plurality of longitudinally extending teeth.

References Cited

UNITED STATES PATENTS

| | | | |
|---|---|---|---|
| 2,835,000 | 5/1958 | Forsthoefel | 49—71 |
| 3,114,180 | 12/1963 | Riedl | 49—468 |
| 2,334,856 | 11/1943 | Atkinson | 296—95 |

OTHER REFERENCES

"Honest Charley Speed Shop," copyright 1966, page "N" (NNN) (copy made in group).

BENJAMIN HERSH, Primary Examiner

R. R. SONG, Assistant Examiner